(12) United States Patent
Tomantschger

(10) Patent No.: US 8,182,938 B2
(45) Date of Patent: May 22, 2012

(54) COMPOSITE CURRENT COLLECTOR FOR ELECTROCHEMICAL CELL

(75) Inventor: Klaus Tomantschger, Mississauga (CA)

(73) Assignee: Rosecreek Technologies Inc.

( * ) Notice: Subject to any disclaimer, the term of this patent is extended or adjusted under 35 U.S.C. 154(b) by 0 days.

(21) Appl. No.: 13/099,390

(22) Filed: May 3, 2011

(65) Prior Publication Data

US 2011/0223470 A1    Sep. 15, 2011

Related U.S. Application Data

(63) Continuation of application No. 12/024,139, filed on Feb. 1, 2008, now Pat. No. 7,976,976.

(60) Provisional application No. 60/888,572, filed on Feb. 7, 2007.

(51) Int. Cl.
*H01M 2/16* (2006.01)

(52) U.S. Cl. ........ 429/135; 429/303; 429/306; 429/215; 429/222; 429/225; 429/230; 429/234

(58) Field of Classification Search .................. 429/131, 429/135, 303, 309, 212, 222, 225, 226, 230, 429/234, 306, 215
See application file for complete search history.

(56) References Cited

U.S. PATENT DOCUMENTS

| | | | |
|---|---|---|---|
| 3,069,485 A | 12/1962 | Winger | |
| 4,267,243 A * | 5/1981 | Park et al. ..................... | 429/136 |
| 4,291,443 A | 9/1981 | Laurie | |
| 4,925,747 A | 5/1990 | Kordesch | |
| 5,162,169 A | 11/1992 | Tomantschger | |
| 5,164,274 A | 11/1992 | Kordesch | |
| 5,340,666 A | 8/1994 | Tomantschger | |
| 5,376,480 A | 12/1994 | Shinoda | |
| 5,462,109 A | 10/1995 | Vincze | |
| 5,626,988 A | 5/1997 | Daniel-Ivad | |
| 5,824,284 A * | 10/1998 | Satoh et al. ................. | 423/594.4 |
| 5,834,141 A | 11/1998 | Anderson | |
| 5,965,295 A * | 10/1999 | Bando et al. .................. | 429/223 |
| 5,989,749 A | 11/1999 | Kao | |
| 6,087,030 A | 7/2000 | Collien | |
| 6,251,539 B1 | 6/2001 | Brys et al. | |
| 6,664,006 B1 * | 12/2003 | Munshi ........................ | 429/305 |
| 6,797,403 B2 | 9/2004 | Clark | |
| 7,553,553 B2 | 6/2009 | Palumbo | |
| 2003/0134192 A1 * | 7/2003 | Katsumoto et al. ........... | 429/176 |
| 2004/0048125 A1 * | 3/2004 | Curelop et al. ................. | 429/27 |
| 2004/0265697 A1 * | 12/2004 | Tamura et al. ........... | 429/231.95 |
| 2005/0089759 A1 * | 4/2005 | Hwang et al. ................. | 429/245 |
| 2005/0233209 A1 * | 10/2005 | Sudano et al. ................. | 429/160 |
| 2006/0078799 A1 * | 4/2006 | Watanabe et al. ............. | 429/245 |
| 2007/0072077 A1 | 3/2007 | Kusumoto | |
| 2007/0128516 A1 * | 6/2007 | Im et al. ........................ | 429/217 |

* cited by examiner

*Primary Examiner* — Patrick Ryan
*Assistant Examiner* — Ben Lewis

(57) ABSTRACT

Composite current collectors containing coatings of metals, alloys or compounds, selected from the group of Zn, Cd, Hg, Ga, In, Tl, Sn, Pb, As, Sb, Bi and Se on non-metallic, non-conductive or poorly-conductive substrates are disclosed. The composite current collectors can be used in electrochemical cells particularly sealed cells requiring a long storage life. Selected metals, metal alloys or metal compounds are applied to polymer or ceramic substrates by vacuum deposition techniques, extrusion, conductive paints (dispersed as particles in a suitable paint), electroless deposition, cementation; or after suitable metallization by galvanic means (electrodeposition or electrophoresis). Metal compound coatings are reduced to their respective metals by chemical or galvanic means. The current collectors described are particular suitable for use in sealed primary or rechargeable galvanic cells containing mercury-free and lead-free alkaline zinc electrodes.

20 Claims, No Drawings

COMPOSITE CURRENT COLLECTOR FOR ELECTROCHEMICAL CELL

CROSS-REFERENCE TO RELATED APPLICATIONS

This application is a continuation of U.S. application Ser. No. 12/024,139 filed Feb. 1, 2008 now U.S. Pat. No. 7,976,976.

Under 35 U.S.C. §119(e) this application claims the benefit of U.S. Provisional Application No. 60/888,572 filed Feb. 7, 2007, which is hereby incorporated by reference in its entirety.

FIELD OF THE INVENTION

This invention relates to components for electrochemical cells including electrosynthesis; electroplating cells, fuel cells as well as galvanic cells such as primary or rechargeable cells. The invention is particularly suited for sealed galvanic cells such as various zinc-batteries and lead-acid batteries. In particular, the invention relates to minimizing the generation of hydrogen in the cell while providing a high rate cell with high discharge capacity, high specific power density and high specific energy density as well as long shelf life which can be manufactured economically in large volume.

The invention aims to provide a non metallic, non-conductive or only poorly-conductive current collector substrate (e.g. polymer or ceramic based) rendered sufficiently conductive by applying a metallic coating layer with a high hydrogen overvoltage selected from the group of Zn, Cd, Hg, Ga, In, Tl, Sn, Pb, As, Sb, Bi and Se. Coatings comprise metallic coatings using at least one metal from this group. In an alternative embodiment the coatings comprise non-conductive or poorly-conductive compounds of one or more elements from the group. These coatings are suitably converted to their metallic state in a subsequent step by chemical or electrochemical means. The composite current collector design and the conductive materials employed greatly reduce or eliminate the need for prior art all-metal current collectors presently used. A significant benefit of the composite current collectors disclosed is the avoidance of materials responsible for significantly increased hydrogen gassing, specifically metals, including copper and iron, as well as electrically conductive carbon-based materials including graphite, carbon black and carbon nanotubes.

Heretofore, because of its high electrical conductivity, copper has been commonly employed directly or as alloying element in brass or bronze metallic current collectors in numerous electrochemical cells. Similarly, copper or copper alloy nails, wires, wire meshes, expanded metal grids, foils, sheet and the like are being used in a variety of electrochemical devices. The novel composite article can be employed as a current collector in all applications heretofore satisfied with all-metal designs and/or composite particulates e.g. in the shape of fibers or flakes can be added to the active materials to enhance the overall electrical conductivity of the electrode active material paste or gel, improving high power performance, maximizing active materials utilization, minimizing Ohmic voltage losses and providing high vibration strength and impact resistance particularly in sealed cells.

The composite current collectors as well as composite, conductive, non-consumable additives are particularly suitable for use in galvanic cells. "Spirally wound" cylindrical cells e.g. non-aqueous Li-cells or aqueous cells such as nickel-cadmium, nickel-metal hydride, nickel-zinc or selected $MnO_2/Zn$ cells employ metal foil, sheet, perforated sheet, woven or expanded mesh, foam or felt as current collector. "Bobbin" type cylindrical cells employing zinc as the negative electrode active material are predominately $Zn/MnO_2$ cells. $Zn/MnO_2$ cells such as "AAA", "AA", "C" and "D" size alkaline cells employ current collector nails as illustrated in FIG. 1 of U.S. Pat. No. 5,626,988; "tongues" such as shown in U.S. Pat. No. 3,069,485, or more complex designs as illustrated in U.S. Pat. Nos. 4,942,101; 5,639,578; 6,482,543; all respective disclosures are incorporated into this application in their entirety.

Aqueous galvanic cells may employ means of recombining hydrogen which may be evolved during storage, recharging, use or during abuse (e.g. overcharging, cell reversal). Thus, in aqueous cells, particularly cells with aluminum, cadmium, lead, magnesium or zinc negative electrodes, the loss of water is reduced or avoided and the risk of pressure build-up within the cell and cell venting and/or leakage is drastically reduced. The shelf life of such cells is extended to durations heretofore considered impossible to achieve with mercury-free and/or lead-free alkaline zinc cells (>10 years at room temperature). The inventive cells also enable prolonged storage or application in high temperature environments (e.g. oil and mineral drilling "down the hole" applications requiring operating temperatures exceeding 50° C., typically 70 to 120° C.). Mercury-free and lead-free alkaline $Zn/MnO_2$ cells of the present invention maintain high discharge capacities over a heretofore unseen storage life.

DESCRIPTION OF PRIOR ART/BACKGROUND OF THE INVENTION

The patent literature is extensive on various features of electrochemical cell designs dealing with current collector designs, improvements of electrical conductivity and active material utilization as well as hydrogen gas generation in aqueous electrolyte sealed cells e.g. containing alkaline zinc electrodes or acidic lead electrodes. The prior art exclusively relies on all metal current collectors:

Winger in U.S. Pat. No. 3,069,485 (1962) describes the "brass-tongue" current collector riveted to the closure member used in various forms for many years in Union Carbide/Eveready alkaline cells.

Brys in U.S. Pat. No. 6,251,539 (2001) describes means of improving the performance of alkaline cells comprising a zinc anode and manganese dioxide cathode especially in high power application by the addition of electrically conductive powders such as tin, copper, silver, magnesium, indium or bismuth to the anode mixture. The conductive powders are in physical mixture with the zinc particles. A preferred electrically conductive powder is tin powder. The alkaline cells employing the conductive powders preferably contain no added mercury and preferably are also essentially free of lead.

Collien in U.S. Pat. No. 6,087,030 (2000) describes novel alkaline electrochemical cells having high drain capacities at voltages of at least 1.1V for use in small appliances such as hearing aids. The anode includes potassium hydroxide, zinc powder, 0.02% to 0.5% of a reaction rate enabling compound selected from a compound of indium, cadmium, gallium, thallium, germanium, tin, or lead, with indium compounds being preferred. The anode material optionally further includes a low level of mercury, and preferably a surfactant comprising hydroxyethylcellulose. The cathode-provides sufficient oxidative capability to oxidize the zinc at a sufficient rate to support the electrical drain demands on the cell. A cathode, in a preferred zinc-air cell for a hearing aid, includes at least 5 air ports, evenly distributed over the surface of the bottom of the cathode can.

Shinoda in U.S. Pat. No. 5,376,480 (1994) describes a gelled negative electrode for an alkaline battery without mercury enabling uniform dispersion of zinc or zinc alloy powder and an effective metal which can be one or more of an oxide or hydroxide of indium, lead, gallium, bismuth. The zinc or zinc alloy powder and the effective metal are dry mixed in advance of mixing with a gelled alkaline electrolyte. In order to obtain satisfactorily high vibration strength and impact, resistance, fiber material can be added to the gel to form the negative electrode. The fiber material may be selected among Rayon, Vinylon, Acryl, Vinyon, polyamide, polypropylene, polyethylene, mercerized pulp, and linter pulp.

Daniel-Ivad in U.S. Pat. No. 5,626,988 (1997) describes zinc active powder for a mercury-free rechargeable electrochemical cell coated with a surfactant, and separately with an aqueous solution of indium sulfate. Without any subsequent filtering, washing or drying, the powder is employed in the anode gel of an electrochemical cell. The cell can include a hydrogen recombination catalyst in to contact with the electrochemically active material of the cathode.

Tomantschger in U.S. Pat. No. 5,162,169 (1992) discloses a rechargeable or primary electrochemical cell in which hydrogen may evolve. The cell contains an auxiliary electrode material comprising manganese dioxide and a catalyst as the oxidant providing for the recombination of pressurized hydrogen at pressures ranging from substantially zero gauge pressure up to the relief pressure of the cell. The cell is a sealed cell having a manganese dioxide cathode, a zinc anode and aqueous electrolyte contacting both anode and cathode. The aqueous electrolyte may be alkaline or it may be ammonium chloride or zinc chloride, or mixtures thereof. Suitable catalysts include silver, platinum, silver oxide, or silver dioxide.

SUMMARY OF THE INVENTION

This invention focuses on providing inexpensive, lightweight, conductive composites for use as current collector and/or as conductive additive to the active material in electrochemical cells. The invention is particularly suited for use in negative electrodes of aqueous electrolyte galvanic cells to enhance the electrical performance (discharge capacity, specific power, specific energy and where applicable cycle life) while minimizing hydrogen gassing and providing exceptionally long shelf lives.

It is an objective of the invention to provide lightweight composite current collectors and/or lightweight composite additives with high conductivity for use in electrochemical cells in an economic and convenient manner by suitably coating non-conductive or poorly-conductive substrates such as filled or unfilled polymers or ceramics with a high hydrogen overvoltage metallic coating comprised of (1) an alloy of two or more metals or (2) at least one metal, selected from the group of Zn, Cd, Hg, Ga, In, Tl, Sn, Pb, As, Sb, Bi and Se. Non-conductive, or poorly-conductive substrates defined herein are materials with an electrical resistivity greater than $500 \times 10^{-8}$ $\Omega \cdot m$ or an electrical conductivity smaller than $0.02 \times 10^7$ S/m.

It is an objective of the invention to provide a composite current collector and/or composite conductive additives for an electrochemical cell having a density in the range of 0.1 to 10 g/cm$^3$, an electrical conductivity in the range of $10^3$ to $10^7$ S/m, said current collector and/or said composite conductive additives comprising a metallic coating with a thickness in the range of 1 and 5,000 microns.

It is an objective of the invention to provide composite articles free of any metals including Cu, Fe and, precious metals (i.e. Pt, Pd, Au, Rh, Ru) and free of elementary carbon such as carbon black and graphite which are known to increase the hydrogen gassing rate, for use as current collectors and/or as conductive additives to the active material in sealed cells employing aluminum, cadmium, magnesium, lead or zinc negative electrodes. Apart from unavoidable impurities negative zinc electrodes of the present invention are substantially free of mercury and lead ("no Hg or Pb added"). "Sealed" cells employ "safety vents" which rupture at predetermined pressures or "resealable vents" which have the ability to repeatedly vent built-up gasses and reseal after the release of built-up gas pressure.

It is an objective of the invention to provide a composite current collector substantially free of Cu and Fe for an aqueous electrochemical cell, specifically a sealed galvanic cell, comprising a zinc negative electrode which is substantially free of Hg, Cd and Pb, wherein said composite current collector of said zinc negative electrode has a density in the range of 0.1 to 6 g/cm$^3$, an electrical conductivity in the range of $10^3$ to $10^7$ S/m, and/or a total resistivity in the range of 2 to 500 m$\Omega$, and said composite current collector comprising a metallic coating/layer on a polymer substrate characterized by:
  (i) said metallic coating/layer being (1) an alloy of two or more metals or (2) at least one metal, selected from the group of Zn, Ga, In, Tl, Sn, As, Sb, Bi and Se; and
  (ii) said metallic coating/layer having a thickness in the range of 1 and 500 microns.

It is an objective of the invention to provide a composite current collector substantially free of Cu and Fe for an aqueous electrochemical cell, including a sealed galvanic cell, comprising a zinc negative electrode wherein said metallic coating is selected from the group of In, Sn or In—Sn alloys, said composite current collector has a density between 0.1 and 3 g/cm$^3$, and the voltage drop across the entire height of said current collector at an applied current of 1 Ampere is between 1 mV and 250 mV.

It is an objective of the invention to provide electrically conductive composites from predominantly non-conductive or only poorly-conductive substrates such as polymer materials or ceramics, in which the required high electrical conductivity is achieved by a coating with compounds (which are subsequently reduced) and/or highly conductive metals and/or alloys, selected from the group of Zn, Cd, Hg, Ga, In, Tl, Sn, Pb, As, Sb, Bi and Se.

It is an objective of the invention to provide the electrically conductive coating by convenient means including chemical means (electroless deposition, cementation, chemical reduction), galvanic means (electrodeposition, electrophoresis), vacuum deposition techniques, extrusion, or suitable polymeric paints containing the high-overpotential metal and/or metal alloy or, alternatively, metal compound particles in the dispersed form.

In the case of metal compound coatings (e.g. sulfates, oxides, hydroxides, stearates) it is an objective of the invention to convert the non-conductive or poorly-conductive coatings to a highly electrically conductive metallic coating by suitable "ex-situ" chemical reduction (e.g. hydrazine, borohydride) or galvanic means. "In-situ" chemical reduction by the zinc active electrode material or by an applied current can be employed as well.

It is an objective of the invention to provide a composite current collector for an electrochemical cell wherein the polymer substrate surface is rendered conductive by applying a conductive paint containing (1) at least one metal, (2) a metal alloy or (3) a compound, selected from the group of Zn, Cd, Hg, Ga, In, Tl, Sn, Pb, As, Sb, Bi and Se.

It is an objective of the present invention to provide composite current collectors for electrochemical cells, wherein said composite current collectors have the shape of a nail, tube, foil, plate, woven mesh, expanded mesh or more complex shapes selected from the group consisting of spirals, blades, suitable formed or bent foils or tubes book mold type grid designs, radial grids, expanded grids, punched foil, otherwise suitably perforated foils and open cell foams. Composite current collectors can be suitably perforated or hollowed to provide space for gas expansion, additional electrolyte, active electrode material or gas recombination devices. Typical galvanic cells employing the current collector are cylindrical or prismatic cells. Typical galvanic cells contain positive electrodes comprising at least one active material selected from the group of manganese dioxide, nickel oxides, lead oxides and oxygen and optionally employ a hydrogen recombination catalyst.

It is an objective of the invention to provide current collectors for primary or rechargeable galvanic cells containing alkaline zinc electrodes free of mercury, cadmium and lead.

It is an objective of the invention to provide primary or rechargeable galvanic cells containing alkaline zinc electrodes free of mercury and lead containing the composite current collector which after 6 years of storage at room temperature and/or 4 weeks at 65° C. have a pass rate of over 85%, preferably over 90%, and ideally 100% with respect to leakage/frosting (e.g. using at least 10 cells per test) and exhibit a discharge capacity retention of more than 10%, preferably more than 50%.

It is an objective of the invention to provide current collector "nails" for primary or rechargeable galvanic cells i.e. alkaline zinc cells of complex shapes i.e. spirals, blades, suitable formed or bent foils or tubes, e.g. suitably perforated or hollowed to provide for a "gas expansion cavity" or to provide additional electrolyte (e.g. gelled KOH). Complex shapes are readily formed using polymer substrates by conventional polymer processing methods such as injection molding, compression molding or blow molding or other economical thermoplastic processing techniques. Unlike metal components, polymer parts can readily be transformed into multifunctional parts, saving costs by reducing part count and eliminating assembly and finishing steps.

It is an objective of the invention to provide a composite current collector which, by appropriate selection of its Ohmic resistance, effectively limits the short circuit current to safe levels providing for an additional safety feature, i.e., in the case of a galvanic zinc cell the short circuit current of the cell, when expressed in Amperes, is limited to a value between 50% and 100% of the value of the zinc amount expressed in grams.

It is an objective of the invention to provide a composite current collector which, by appropriate selection the melting point of its metallic layer, ohmic resistance and thickness, effectively provides a fuse, and upon the passage of a high current in case of abuse, i.e., a short circuit, at least, a portion of the low melting point metallic layer melts and disrupts the current flow.

It is an objective of the invention to provide composite current collectors for wound or prismatic electrochemical and galvanic cells including woven mesh, expanded mesh, open cell foams, foils and plates employing "edge collection", as well as foils and ribbed current collectors used in "bipolar cell" designs.

It is an objective of the invention to provide composite conductive particles e.g. flakes, needles or platelets to be added to the electrode active material (e.g. zinc gel in case of alkaline zinc cells, or lead negative or lead dioxide positive electrode in lead-acid batteries) of electrochemical cells to enhance the active material utilization and power density without compromising shelf life, at significantly reduced densities and cost compared to their "all metal counterparts". Composite conductive particles represent between 0.1 and 25% of the volume or weight of said active material and have a high hydrogen overvoltage metallic coating comprised of (1) an alloy of two or more metals or (2) at least one metal, selected from the group of Zn, Cd, Hg, Ga, In, Tl, Sn, Pb, As, Sb, Bi and Se in the thickness range of 1 to 5,000 microns on a suitable non-conductive or poorly-conductive substrate e.g. as listed in Table 1. The composite conductive particles dispersed in the electrode active material are in electrical contact with the composite current collector thereby enhancing overall electrode conductivity, active material utilization and peak power capability.

It is an objective of the invention to optimize the composite current collector for conductivity, i.e., by employing the metallic coating with a predetermined coating thickness profile ranging from uniform thickness along its length/width to varying thickness along its length/width. In the case of a nail collector used in alkaline zinc cells, i.e., the metallic coating can have the highest thickness in the vicinity of the negative post and the thickness of the layer can be tapered to be thinning down appropriately to the other end.

It is an objective of the invention to provide composite conductive articles such as composite current collectors and/or composite conductive additives for electrochemical cells which are stiff and rigid using soft metals such as In, Sn and Pb, minimizing the use of expensive base metals.

It is an objective of the invention to provide composite conductive articles such as composite current collectors and/or composite conductive additives for electrochemical cells using inexpensive substrates such as polymers ($/lb: 0.10-3.00) eliminating the use of Cu (January 2007 $/lb: 2.60) and minimizing the use of expensive base metals such as In ($/lb: 375.-), Bi ($/lb: 8.00), Sn ($/lb: 5.50), Pb ($/lb: 0.70) and Zn ($/lb: 1.65).

It is an objective of the invention to provide composite conductive articles such as composite current collectors and/or composite conductive additives for electrochemical cells using inexpensive substrates such as polymers coated with a metal or alloy of two or more elements selected from the group of Pb, Ca, Sb, As and Sn for use as current collectors in lead-acid batteries.

It is an objective of the invention to provide a composite current collector for use in a sealed lead-acid cell or battery, and wherein said composite current collector has a density in the range of 1 to 10 g/cm$^3$, said metallic coating has a thickness in the range of 1 and 5,000 microns and wherein the voltage drop, along the entire height of said current collector at an applied current of 100 Amperes ranges from 1 mV to 1 V.

It is an objective of the invention to provide articles such as composite current collectors and/or composite conductive additives for electrochemical cells which are strong, wear and abrasion resistant, as well as light-weight and can be manufactured by a convenient and cost-effective production process.

It is an objective of the invention to employ polymer materials which can readily be electroplated by adding fillers to the polymers. Suitable fillers are metals, alloys or compounds, selected from the group of Zn, Cd, Hg, Ga, In, Tl, Sn, Pb, As, Sb, Bi and Se. If metallic compound are employed as fillers, i.e., in the form of their oxides, they can be reduced to their metallic state on and near the outer surface. To further increase the metallic layer thickness they can thereafter be directly electroplated without the need to metallize the polymer surface.

It is an objective of the invention to provide a composite current collector comprising a polymer substrate selected from the group of filled or unfilled epoxy resin composites; epoxy resins; cellulose based materials; thermoplastic polyolefins (TPOs); thermoplastic polyester resins; thermoplastic polyester elastomers; crystalline, semi-crystalline and amorphous polymers; polyethylene; polypropylene; polyvinyl chloride (PVC); polytetrafluoroethylene (PTFE); polystyrene; acrylonitrile-butadiene-styrene (ABS); polyphthalamide (PPA), polycarbonate (PC), polyamide (PA), polyester (PET, PBT), polyacetals (POM); liquid crystal polymers (LCP), polyphenylene sulfide (PPS), polysulfone (PS) and polyetherimide (PEI); and wherein said polymer substrate contains between 0% and 75% per volume and/or weight of one or more filler materials selected from the group of (1) at least one metal, (2) a metal alloy or (3) at least one compound, selected from the group of Zn, Cd, Hg, Ga, In, Tl, Sn, Pb, As, Sb, Bi and Se.

According to one aspect of the present invention the process comprises the steps of positioning the conductive or metallized substrate to be plated in a plating tank containing a suitable aqueous electrolyte and optionally a fluid circulation system, providing electrical connections to the substrate to be plated and to one or several anodes and electroplating or electrophoretically depositing a layer of a suitable metallic material on at least part of the external surface area of the substrate using suitable direct current (D.C.) or pulse electrodeposition to deposition rates exceeding at least 1 micro/hour, preferably at least 10 micron/hour and more preferably greater than 50 micron/hour.

It is an objective of the invention to provide a process for manufacturing a negative zinc electrode using an electrolyte such as aqueous potassium hydroxide for use in primary or rechargeable galvanic cells exhibiting superior electrical and shelf-life performance characteristics when compared to known cells of this type.

It is an objective of the invention to provide zinc electrodes with reduced hydrogen gassing characteristics for use in single use or rechargeable galvanic cells containing an aqueous potassium hydroxide electrolyte.

It is an objective of the invention to provide zinc electrodes for use in a galvanic cells containing aqueous potassium hydroxide electrolyte which have a reduced tendency to form dendrites and cause shorting.

It is an objective of the invention to coat the non-conductive or poorly-conductive substrate with metals or alloys of two or more metals, selected from the group of Zn, Cd, Hg, Ga, In, Tl, Sn, Pb, As, Sb, Bi, and Se to a coating thickness ranging from 1 micron to 5 mm to enhance the electrical conductivity sufficiently to enable the use of the resulting composite parts as current collectors in electrochemical cells.

It is an objective of this invention to at least partially coat complex shapes with a layer of high hydrogen overvoltage metals, alloy or compound coatings not requiring the use of any substances which may compromise gassing included, but not limited to, Cu, Fe, precious metals (i.e. Pt, Pd, Au, Rh, Ru) and elemental carbon materials (graphite, carbon black, carbon nanotubes).

It is an objective of the invention to provide suitable composite current collectors for use in galvanic cells which are strong, lightweight and corrosion resistant.

It is an objective of the invention to provide suitable current collectors for use in galvanic and electrochemical cells with improved mechanical and suitable electrical properties containing a metallic coating/layer manufactured by convenient processes selected from electrodeposition, electroless deposition, electrophoretic deposition, cementation, chemical vapor deposition (CVD), physical vapor deposition (PVD), sputtering. Metallic tapes can also be used which are attached to the substrate using adhesives. Alternative fabrication methods furthermore include partially embedding suitable metallic materials into the outer surface of the polymer substrate e.g. by employing powder coating methods including, but not limited to, cold or hot spraying, optionally followed by overcoating e.g. using electrodeposition.

It is an objective of the invention to provide suitable current collectors for electrochemical cells wherein the polymer substrate is rendered conductive by applying a conductive paint containing (1) at least one metal, (2) a metal alloy or (3) at least one compound, selected from the group of Zn, Cd, Hg, Ga, In, Tl, Sn, Pb, As, Sb, Bi and Se.

Table 1 provides a listing, describing suitable characteristics for articles such as composite current collectors and/or composite conductive additives for electrochemical cells according to the invention:

TABLE 1

| | Minimum | Maximum |
|---|---|---|
| Composite article density [g/cm$^3$] | 0.1; 0.5 | 3; 5; 7; 10 |
| Non-metallic substrate density [g/cm$^3$] | 0.5; 1 | 7; 10 |
| Particulate fraction of additive in non-metallic substrate [% by volume or % per weight] | 0; 1; 5; 10 | 50; 75; 95 |
| Coating thickness [micron] | 1; 5; 30; 50 | 100, 250; 500; 5,000 |
| Coating deposition rate [mm/hr] | 0.01 | 10 |
| Amount of composite conductive particulate additives in electrode active material such as gel or paste [% by volume or % per weight] | 0.1; 1 | 10; 25 |
| Leakage after storage for 4 weeks @ 65° C. (sample size of 10) [% Pass Rate] | 85; 90 | 95; 100 |
| Discharge Capacity Retention after storage for 4 weeks @ 65° C. [%] | 10 | 95; 100 |
| Discharge Capacity Retention after room temperature storage for six years [%] | 10 | 95; 100 |
| Suitable elements for use in the metallic coating or in substrate additives | | Zn, Cd, Hg, Ga, In, Tl, Sn, Pb, As, Sb, Bi and Se |
| Suitable alloying additions | | Zn, Cd, Hg, Ga, In, Tl, Sn, Pb, As, Sb, Bi, Se and P |
| Suitable compounds for use in non-conductive substrates or "paints" | | pure or mixed oxides, pure or mixed hydroxides, pure or mixed salts (e.g. chlorides, fluorides, bromides, iodides, sulfates, stearates); or pure or mixed carbides of Zn, Cd, Hg, Ga, In, Tl, Sn, Pb, As, Sb and Bi. |
| Suitable substrate materials: | | filled or unfilled epoxy resin composites; epoxy resins; cellulose based materials; thermoplastic polyolefins (TPOs); thermoplastic polyester resins; thermoplastic polyester elastomers; crystalline, semi-crystalline and amorphous polymers; polyethylene; polypropylene; polyvinyl chloride (PVC); polytetrafluoroethylene (PTFE); polystyrene; acrylonitrile-butadiene-styrene (ABS); polyphthalamide |

TABLE 1-continued

| | Minimum | Maximum |
|---|---|---|
| | | (PPA), polycarbonate (PC), polyamide (PA), polyester (PET, PBT), polyacetals (POM); liquid crystal polymers (LCP), polyphenylene sulfide (PPS), polysulfone (PS) and polyetherimide (PEI). Ceramics, glass, glass fibers (for use in neutral or acidic electrolytes) |

Preferred embodiments of the invention are defined in the corresponding dependent claims.

PREFERRED EMBODIMENTS OF THE INVENTION

The person skilled in the art of zinc batteries, in conjunction e.g. with U.S. Pat. No. 5,626,988 (1997), U.S. Pat. No. 5,162,169 (1992), U.S. Pat. No. 5,376,480 (1994) or U.S. Pat. No. 6,251,539 (2001) cited already, will know how to assemble primary or rechargeable galvanic cells containing a negative zinc electrode and an all-metallic current collector. Their respective disclosures are incorporated into this application in their entirety.

As indicated, according to one preferred embodiment of the present invention, there is provided a sealed mercury-free primary or rechargeable cell comprising: a cathode, an electrolyte, an anode, and a separator between the anode and the cathode.

Preferably, the active material of the cathode comprises at least one of manganese dioxide, nickel oxides and in the case of non-sealed air cells, oxygen. In sealed cells the cathode active material, the container wall, the "void space" or the anode preferably includes a suitable hydrogen recombination catalyst. The catalyst can be provided as a coating on the cathode exterior or the cell container.

The electrochemical cell can include a finely divided hydrogen recombination catalyst comprising at least one of a hydrogen storage alloy, silver, and a silver oxide which are electronically and ionically connected to the metal oxide active material of the positive electrode. Preferably, the hydrogen recombination catalyst comprises 0.01-5% by weight of the electrochemically active material of the positive electrode. Preferably sufficient catalyst should be provided to maintain the hydrogen pressure below the venting pressure ($\leq$60 atmospheres) at all times.

As a further aspect of the present invention, there is provided a mercury-free and lead-free primary or rechargeable cell comprising: a zinc anode; a cathode having an active powder including oxides of manganese and/or nickel; a separator including at least one semi-permeable membrane layer; an electrolyte solution in the separator, the cathode and the anode, and filling pores thereof, wherein the anode, mixture comprises a zinc active powder, the electrolyte, an indium additive and a surfactant selected from the group consisting of, octylphenoxypolyethoxyethanols, polypropylene glycols, polyethoxyglycols and organic phosphate esters, typically having a molecular weight in the range of 300 to 1500.

The electrolyte can comprise an aqueous solution of potassium hydroxide having a concentration in the range of about 25% to 45%. It may also include potassium zincate having a concentration in the range 0.1% to 12%.

The negative electrode active material can be selected from the group of magnesium, aluminum, lead and zinc. In one preferred embodiment the anode comprises zinc powder as the active material that preferably is alloyed with or has been coated with at least one element selected from the group of Pb, In, Bi, Ga, Sn, Sb, Al as provided by a number of "alkaline battery grade" zinc powder suppliers such as the Zinc Corporation of America, Noranda, Grillo, Union Miniere, to name a few. Preferably the zinc electrode is "gelled" and furthermore contains a suitable surfactant. The surfactant is preferably selected from the group comprising organic phosphate esters, octylphenoxypolyethoxyethanols, polypropylene glycols and polyethyleneglycols. More preferably, the surfactant is polypropylene glycol having a molecular weight in the range 400-800. Preferably, the electrolyte comprises an aqueous solution of potassium hydroxide, optionally including potassium zincate, and/or potassium fluoride.

Typical embodiments include "AAAA", "AA", "C" and "D" hermetically sealed cylindrical cells including a battery can containing a positive electrode in form of a sleeve, a separator between positive and negative electrode and a gelled zinc electrode in the central cavity. The upper end of the cell is hermetically sealed by a cell closure assembly, including a polymer negative cap protruded by the "nail assembly". The nail assembly includes a negative cap, which serves as the negative terminal and provides support to the polymeric negative cap is attached to the current collector "nail" or "sheet" The nail extends into the anode gel typically to at least half of its height. Heretofore current collector nails used were exclusively all metallic components made out of Cu—Zn (brass) alloys. As noted, a galvanic reaction can occur between the current collector and the negative active material, specifically between Cu and Zn resulting in hydrogen gas generation. Although the brass current collector typically becomes coated by Zn or Zn(Hg) after insertion into the anode gel, Cu continues to react with the electrolyte and reduce water to hydrogen, and/or Cu can be oxidized and can migrate into the anode'gel significantly elevating the gassing rates of the negative electrode. To minimize this reaction, conventional brass current collectors can be coated with a metal of high hydrogen overvoltage. As coatings are usually not totally porosity free, as well as eventually deteriorate with time, dissolve or oxidize, and eventually expose the underlying brass coating causing significant increase in gassing rates and the electrical performance and shelf life of the battery suffers.

Analyzing the overall electrical conductivity of the current collector required in such applications, the applicant surprisingly discovered that the amount of metal required to provide adequate electrical performance can be substantially reduced compared to prior art designs. For instance "AA" cells typically contain brass nails about 3 cm long with a diameter of about 1 mm to 3 mm, when in fact a metallic coating 5 micron to 250 micron thick in most cases is more than adequate. As such novel composite current collectors are provided consisting of a suitable metal or alloy coating on a totally inert, non-conductive or poorly-conductive substrate such as a polymer material or even a ceramic substrate.

Suitable polymer substrates include filled or unfilled epoxy resin composites, epoxy resins; cellulose based materials; thermoplastic polyolefins (TPOs); thermoplastic polyester resins; thermoplastic polyester elastomers; crystalline, semi-crystalline and amorphous polymers; polyethylene; polypropylene; polyvinyl chloride (PVC); polytetrafluoroethylene (PTFE); polystyrene; acrylonitrile-butadiene-styrene (ABS); polyphthalamide (PPA), polycarbonate (PC), polyamide (PA), polyester (PET, PBT), polyacetals (POM); liquid crystal polymers (LCP), polyphenylene sulfide (PPS), polysulfone (PS) and polyetherimide (PEI). Suitable fillers include metals, metal alloys, ceramics and mineral fillers.

Specifically for this applications preferred filler materials include metals, alloys or compounds which do not raise the hydrogen gassing rate of the negative electrode, selected from the group of Zn, Cd, Hg, Ga, In, Tl, Sn, Pb, As, Sb, Bi, and Se that can readily be mixed into the polymer during processing. In case compound are incorporated into the polymer substrates, after forming into their desired shape, they can be conveniently reduced to render them conductive on and near the surface to enable direct electrodeposition of the desired metal coating without further metallization. Oxides, hydroxides and sulfates are preferred among compounds. Preferably, the polymer substrate contains between 1 and 75% per volume and/or weight of one or more filler materials selected from the group of (1) at least one metal, (2) a metal alloy or (3) at least one compounds, selected from the group of Zn, Cd, Hg, Ga, In, Tl, Sn, Pb, As, Sb, Bi and Se. In case the filler material is at least one compound selected from the group of Zn, Cd, Hg, Ga, In, Tl, Sn, Pb, As, Sb, Bi and Se it is subsequently reduced to its metallic form on at least the outer and near the outer surface of said polymer substrate:

Preferably the coating and the additive(s) in the polymer substrate are chosen to be the same element or elements, i.e. in the case of In conductive coatings preferably suitable In compounds such as $In_2O_3$ are added to the polymer, in case of conductive tin coatings, the preferred polymer additive is a tin compound, e.g. one of the tin oxides; and in the case of conductive In—Sn alloy coating preferred polymer additives are indium and tin compounds; in the case of Pb or Pb—Sn coatings preferred polymer additives are lead or lead and tin compounds, respectively. Matching element(s) of the conductive coating with, the additive(s) of the substrate ensures that no galvanic potential can develop between the coating and the substrate additives. 1-75% per volume and/or 1-75% per weight are suitable ranges of additives in the total volume/weight of the filled polymer.

In the case of alkaline zinc electrodes metals/alloys and/or compounds of Cu, Si, Fe; as well as the use of glass fibers, talc, calcium silicate, silica, carbon, carbon nanotubes, graphite, graphite fibers carbon, graphite are avoided. Suitable fillers or additives are typically added in powdered form (average particle size 0.003-20 microns) during polymer processing or part shaping/molding.

Particularly suitable compounds for use as additives to the non-conductive substrates include pure or mixed oxides of In, Sn, Pb, Bi, Ti, ITO (indium tin oxide), ZnO, $PbO_x$.

Suitable polymers including, but not limited to, polyamides, PE, PP are available from a large number of vendors including Allied Chemical, BASF, Dow, DuPont, Firestone, GE, and Monsanto, to name a few. Other suitable substrates include acrylonitrile-butadiene-styrene (ABS) and thermoplastic polyolefins (TPO), available in "plating grades" and optionally reinforced by a variety of fillers. Ceramic and glass-fiber based substrates as well as glass fiber filled or reinforced polymers are particularly suited substrates for use in neutral or acidic electrolytes e.g. for use in lead-acid battery current collectors.

The surface of the non-conductive or poorly-conductive substrate as prepared by any suitable molding or forming operation is typically quite smooth with a surface roughness $Ra<0.1$ μm. The surface roughness is increased to the range of $Ra=0.15$ λm to $Ra=100$ μm to enhance the adhesion of the metallic coating the substrate surface to be coated by any number of suitable means including, e.g., mechanical abrasion, plasma and chemical etching. A higher surface roughness is usually preferred ($Ra>1$ μm) as it also increases the contact area between the active material and the current collector, thus minimizing the contact resistance between the active material and the current collector.

As outlined a number of convenient coating processes are available including electrodeposition, electroless deposition, electrophoretic deposition, cementation, chemical vapor deposition (CVD), physical vapor deposition (PVD) and, sputtering. CVD, PVD and electroless deposition can be applied directly to any suitable substrate without the need for metallizing.

Electrochemical methods require the polymer substrate to be sufficiently conductive which, as outlined above, can be achieved by applying a conductive paint or incorporating conductive additives in the polymer substrate. Suitable conductive paint are typically dispersions containing (1) at least one metal, (2) a metal alloy or (3) at least one compound, selected from the group of Zn, Cd, Hg, Ga, In, Tl, Sn, Pb, As, Sb, Bi and Se; and a suitable binder. They can be applied by a number of convenient processes including spraying and dipping, typically followed by a suitable curing step. Alternatively, metal oxide thin films e.g. of tin and indium can also be prepared by chemical deposition on polymer or ceramic substrates using their respective chlorides and NaOH solution with triethanolamine as complexing agent. These films can be reduced chemically or electrochemically to form metallic coatings.

Electrochemical deposition methods are inexpensive, provide high deposition rates and good control over the coating thickness. In the case of cylindrical current collectors (wires, post, or tubes) continuous wire plating techniques can be employed. For foil or thin plate coatings continuous drum or belt plating processes can be utilized.

Selected properties of nails of cylindrical cross section (length: 3 cm; outer diameter: 1 mm) of various compositions for use in "AA" alkaline manganese dioxide-zinc cells by indium or tin nails and their corresponding polymer coated ones coated with 100 micron of In or Sn are illustrated in the Table 2. To clarify density, in this context it is defined as the weight of the current collector in grams divided by its true volume in $cm^3$. The true volume of simple or complex shapes can be determined easily e.g. by measuring the displacement volume after submersing the article in its entirety in a suitable fluid such as water. To clarify conductivity, resistivity and voltage drop readings "along the entire height" of said composite current collector in this context are defined as follows: Current collectors extend from one end of the cell towards the other. In edge "collected" cell designs a "cell terminal" is used, e.g. in the case of brass nail in an alkaline cell the negative cap is welded to the current collector nail. The "entire height" of the nail therefore extends from the location where the nail is attached to the negative cap to the opposite end of the nail, e.g., in the case of 3 cm long nail, "the entire height" is 3 cm. In case a blade(s) is/are used the "entire height" of the current collector is the distance from the location where the blade(s) is/are attached (e.g. riveted) to the negative cap to the opposite end of said blade(s). In the case of a grid, e.g. a bookmold or expanded grid the "entire height" is defined as the distance between the lug (which is attached to the post) and the opposite end of the grid. In cell designs where the electrodes are arranged vertically (cylindrical cells, SLI batteries) the "entire height" of the current collector is equivalent to its vertical height. In "bipolar cell" designs no "cell terminal" is used, and the "entire height" of the current collector is the maximum distance electrons have to travel from one side (cell 1) of the bipolar plate to the other (cell 2) e.g. in designs using a simple plate the "entire height" amounts to the plate thickness. Conductivities, resistivities and voltage drops can conveniently be measured by suitable attaching probes to the respective ends of the current collectors as known to persons skilled in the art.

TABLE 2

|  | Prior art: brass (50Cu/50Zn) | Indium | 0.1 mm indium coating on polyethylene | Tin | 0.1 mm tin coating on polyethylene |
|---|---|---|---|---|---|
| Weight [mg] | 188 | 82 | 44 | 141 | 66 |
| Weight Reduction over Brass [%] | 0 | 56 | 77 | 25 | 65 |
| Density [g/cm³] | 8.0 | 3.5 | 1.9 | 6.0 | 2.8 |
| Relative Conductivity Compared with brass [%] | 100 | 30 | 10.8 | 24 | 8.6 |

The next table illustrates the voltage drop of AA cell current collectors (3 cm long/high, 1 mm OD) of various designs at an applied current of 1 Ampere. The composite nails can be made by electroplating the selected metal on a polymer nail i.e. that has been metallized with the same metal using sputter coating. Alternatively, as highlighted paints with fine metal powder or a compound of the selected element such as its oxide can be added to a commercial solvent or water based paint followed by drying or curing, as appropriate, and reduction to the metal/alloy can be achieved by chemical or electrochemical means. Table 3 indicates that even at a coating thickness of 5 micron the voltage drop in the nail is acceptable for the most common drain rates. For typical "AA" cell loads (43Ω, 10Ω and 3.9Ω load resistor) the experienced voltage drop would be significantly reduced. In the case of high rate applications involving continuous or intermitted use e.g. at 2.2Ω or 1.0Ω, the coating thickness may have be increased to as much as 100, 250 or even 500 Micron to keep the IR losses in the current collector at acceptable values.

TABLE 3

| Metallic coating thickness [micron] | Voltage drop on brass nail (50Cu/50Zn) 1 mm diameter, 3 mm long @ 1A across its height in mV | Voltage drop on an indium coated polymer nail 1 mm diameter, 3 mm long @ 1A across its height in mV | Voltage drop on a tin coated polymer nail 1 mm diameter, 3 mm long @ 1A across its height in mV | Voltage drop on a lead coated polymer nail 1 mm diameter, 3 mm long @ 1A across its height in mV |
|---|---|---|---|---|
| Prior art: all metal, no polymer substrate | 1.46 | 3.36 | 4.23 | 8.1 |
| 250 | N/A | 4.5 | 5.6 | 10.7 |
| 100 | N/A | 9.3 | 11.8 | 22.5 |
| 50 | N/A | 17.7 | 22.3 | 42.6 |
| 25 | N/A | 34.5 | 43.4 | 82.9 |
| 10 | N/A | 84.8 | 106.8 | 204.0 |
| 5 | N/A | 168.8 | 212.6 | 406.1 |

As a reference the room temperature conductivity and resistivity of metals suitable for use in the composite current collectors are illustrated in the table 4. In comparison, non-conductive or poorly conductive substrates as defined herein include materials with an electrical resistivity greater than $500\times10^{-8}$ Ω·m, e.g. typical grades of epoxy, polystyrene, ABS and polyethylene have an electrical resistivity greater than $1,000\times10^{-8}$ Ω·m (electrical conductivity smaller than $0.01\times10^7$ S/m).

TABLE 4

|  | Conductivity [$10^7$ S/m] | Resistivity [$10^{-8}$ Ω · m] |
|---|---|---|
| Cu | 5.88 | 1.70 |
| Brass | 3.79 | 3.81 |
| As | 3.00 | 3.33 |
| Bi | 0.086 | 116 |
| Cd | 1.38 | 7.27 |
| Ga | 0.67 | 14.85 |
| Hg | 0.10 | 95.9 |
| In | 1.14 | 8.75 |
| Pb | 0.48 | 21.0 |
| Sb | 0.24 | 41.3 |
| Sn | 0.91 | 11.0 |
| Tl | 0.61 | 16.4 |
| Zn | 1.69 | 5.92 |

Table 5 illustrates the weight, resistivity and voltage drop of prior art and selected metal coated polymer nails (PE, density: 1 g/cm³) comprising a metallic coating of 10 microns as used in typical "AA" alkaline cells (3 cm long, 1 mm OD).

TABLE 5

| Sample ID | Weight of the nail [mg] | Resistivity of Nail (3 cm long, 1 mm OD) [$10^{-3}$ Ω] | Voltage Drop at 1 Ampere across its height [mV] |
|---|---|---|---|
| 100% Brass | 188.5 | 1.46 | 1.46 |
| 10 micron As on polymer | 27.9 | 12.7 | 12.7 |
| 10 micron Bi on polymer | 31.7 | 443.1 | 443.1 |
| 10 micron Cd on polymer | 30.6 | 27.8 | 27.8 |
| 10 micron Ga on polymer | 28.1 | 56.7 | 56.7 |
| 10 micron Hg on polymer | 35.3 | 366.3 | 366.3 |
| 10 micron In on polymer | 25.8 | 33.4 | 33.4 |
| 10 micron Pb on polymer | 33.1 | 80.2 | 80.2 |
| 10 micron Sb on polymer | 28.9 | 157.8 | 157.8 |
| 10 micron Sn on polymer | 28.2 | 42.0 | 42.0 |
| 10 micron Tl on polymer | 33.7 | 62.6 | 62.6 |
| 10 micron Zn on polymer | 29.2 | 22.6 | 22.6 |

Table 6 illustrates the weight, resistivity and voltage drop of prior at and selected metal coated polymer (PE, density: 1 g/cm³) nails comprising a metallic coating of 100 microns as used in typical "AA" alkaline cells (3 cm long, 1 mm OD).

TABLE 6

| Sample ID | Weight of the nail [mg] | Resistivity of Nail (3 cm long, 1 mm OD) [$10^{-3}$ Ω] | Voltage Drop at 1 Ampere across its height [mV] |
| --- | --- | --- | --- |
| 100% Brass | 188 | 1.46 | 1.46 |
| 100 micron As on polymer | 63.4 | 3.5 | 3.5 |
| 100 micron Bi on polymer | 98.2 | 123.2 | 123.2 |
| 100 micron Cd on polymer | 88.0 | 7.7 | 7.7 |
| 100 micron Ga on polymer | 65.1 | 15.8 | 15.8 |
| 100 micron Hg on polymer | 130.4 | 101.8 | 101.8 |
| 100 micron In on polymer | 44.4 | 9.3 | 9.3 |
| 100 micron Pb on polymer | 110.9 | 22.3 | 22.3 |
| 100 micron Sb on polymer | 71.9 | 43.9 | 43.9 |
| 100 micron Sn on polymer | 66.0 | 11.7 | 11.7 |
| 100 micron Tl on polymer | 115.6 | 17.4 | 17.4 |
| 100 micron Zn on polymer | 75.3 | 6.3 | 6.3 |

As highlighted another benefit of the composite current collector is that, by appropriate selection of its Ohmic resistance, the short circuit current of the cell can be effectively limited to safe levels providing for an additional safety feature. Typically, depending on the application, the short circuit current is limited to between the 10 minute and the 1 hr discharge rate current. Short circuit currents (SCC) can be measured as known in the industry, i.e., by shorting the cell and measuring the average current or the final current i.e. over a time period of 100 msec to 1 seconds, or, by a four probe technique using a power supply to force the cell to 0V over a period of time of again about 100 msec to 1 sec and measuring the peak or average current. In the case of alkaline primary or rechargeable cylindrical zinc cells the short circuit current expressed in Ampere can also be limited to between 50% and 150% of the weight of zinc as indicated in the Table 7.

TABLE 7

| Cylindrical Cell Size | Typical Weight of the Zinc Powder [g] | Short Circuit Current at 50% Zn weight [A] | Short Circuit Current at 150% Zn weight [A] |
| --- | --- | --- | --- |
| AAAA | 0.75 | 0.37 | 1.1 |
| AAA | 1.5 | 0.75 | 2.3 |
| AA | 3.5 | 1.75 | 5.3 |
| C | 10 | 5.0 | 15.0 |
| D | 25 | 12.5 | 37.5 |

Furthermore, as a number of the suitable high hydrogen overvoltage metals have a low melting point (In: 156° C., Sn: 232° C., Pb: 237° C., Zn: 419° C.) suitable metals or alloys can be employed as the metallic part of the composite current collector to effectively provide a fuse designed to melt at a predetermined current by the appropriate selection of the metal/alloy, its melting point, ohmic resistance and thickness. In the case of a simple current collector nail as i.e., employed in alkaline cells, the metallic layer on the polymer substrate heats up during a current flow and the ohmic heating occurring in the metallic layer at a predetermined current is sufficient to melt at least a portion of the metallic layer, thereby permanently disrupting the current flow to and from the galvanic cell. One way to achieve a desired "fuse rating" entails thinning the metallic coating on a part of the current collector, i.e., a ring to the predetermined thickness which, under the conditions of abuse, will melt at the desired current thereby effectively terminating current flow.

EXAMPLE 1

AA (LR06) Size Primary Alkaline Cells

Two groups of AA size alkaline $MnO_2$—Zn cells were assembled using typical positive and negative electrode compositions as illustrated in the Table 8 balancing the cell by providing a theoretical two electron zinc electrode capacity of 120% of the theoretical one electron $MnO_2$ electrode capacity. A two component separator (absorber plus cellophane barrier) was employed.

TABLE 8

| Positive electrode | |
| --- | --- |
| Manganese dioxide: | 79.0% |
| 9N Potassium hydroxide solution: | 6.5% |
| Graphite, additives: | 14.5% |
| Negative electrode | |
| Zinc powder (mercury-free) including Lead, Indium & minor alloying components: | 56.35% |
| Zinc oxide powder | 8.60% |
| Polypropylene glycol: | 0.05% |
| Electrolyte (containing 38% KOH + 12% $K_2Zn(OH)_4$ and gelling agent) | 35.00% |

Indium was applied to the Zn—Pb alloy zinc powder (Zinc Corporation of America, Monaca, Pa., USA) by tumbling the zinc alloy powder in an excess of an aqueous solution of indium sulfate to obtain an indium coating on the zinc surface by cementation. The treated zinc powder was filtered, washed repeatedly to remove zinc sulfate and then dried. The powder was then blended thoroughly with a gelling agent, additives and the potassium hydroxide electrolyte to form a gelled electrode.

Table 9 list the open circuit voltage, capacity retention and leakage performance of AA alkaline $MnO_2$/Zn cells after 12 years storage at room temperature for two current collector designs, one using the conventional brass nail (3 cm long, 1 mm outer diameter according to Table 2, col 2, brass) and the Other using an In coated polymer (3 cm long, 1 mm outer diameter according to Table 2, col 4; ~0.1 mm 1 n on PE) highlighting the shelf life extension achievable.

TABLE 9

| | Conventional brass nail | Indium coated polymer nail |
| --- | --- | --- |
| Open Circuit Voltage [mV] | 1569 | 1569 |
| Leakage/Frosting after four weeks storage at 65° C. | 2/10*) | 0/10*) |
| Leakage/Frosting after four weeks storage at 65° C. [% Pass Rate] | 80 | 100 |
| Capacity Retention after four weeks storage at 65° C. on 3.9 Ω continuous discharge to 0.75 V [%] | 66 | 81 |

TABLE 9-continued

|  | Conventional brass nail | Indium coated polymer nail |
|---|---|---|
| Leakage/Frosting after storage for six years at room temperature | 25/25 | 0/25 |
| Leakage/Frosting after storage for six years at room temperature [% Pass Rate] | 0 | 100 |
| Leakage/Frosting after storage for twelve years at room temperature | — | 0/25 |
| Leakage/Frosting after storage for twelve years at room temperature [% Pass Rate] | 0 | 100 |
| OCV after storage for twelve years-at room temperature [mV] | — | 1501 (low: 1496; high: 1508) |
| Capacity Retention after storage for twelve years at room temperature (43 Ω continuous discharge to 0.9 V) [%] | 0 | 87.2 |
| Capacity Retention after storage for twelve years at room temperature (10 Ω continuous discharge to 0.9 V) [%] | 0 | 87.7 |
| Capacity Retention after storage for twelve years at room temperature (3.9 Ω continuous discharge to 0.9 V) [%] | 0 | 83.8 |

*)2/10: 2 cells out of 10 cells tested showed leakage or frosting which constitutes failure The comparative data highlight the significant differences between prior all-metallic current collectors and composite current collectors of the present invention, specifically applicable to sealed primary alkaline zinc batteries.

EXAMPLE 2

AA (LR06) Size Rechargeable Alkaline Cells

Similarly, AA rechargeable alkaline manganese dioxide (RAM) cells were assembled and cycle tested using the same parts, formulation and processing methods described in Example 1 and changing the cell balance to 110%. After 12 years of room temperature storage the average discharge capacity of the In composite current collector at 10 Ohms continuous discharge to 0.9V of three cells tested was 1359 mAh, representing 82% capacity retention when compared to 1650 mAh delivered by the same cells right after assembly. The cumulative capacity of five discharge/charge cycles after 12 years of room temperature storage amounted to 5642 mAh, representing 86% capacity retention when compared to 6590 mAh delivered by the same cells right after assembly. None of the control cells using brass current collectors reached the 12 year room-temperature shelf life.

In the case of lead-acid batteries current collectors typically comprise Pb and Pb alloys, such as Pb—Sb, Pb—Sb—As, Pb—Sn, Pb—Ca—Sn, Pb—Ca—Sn—Ag. Minor alloying components (<1% per weight) include Sr, Ba, Bi, Ag, Se and Al. Suitable prior art all-metal current collectors are prepared by casting molten metals or alloys into suitable shapes e.g. book mold grids (U.S. Pat. No. 5,834,141); continuously casting (U.S. Pat. No. 5,462,109) or extruding strip (U.S. Pat. No. 6,797,403) as well as casting and rolling strip. Pb or Pb-alloy strip can optionally be performed by punching (U.S. Pat. No. 5,989,749), as well as rotary (U.S. Pat. No. 4,291,443) or reciprocating expansion. Composite current collectors for use in negative or positive electrodes in lead-acid batteries are prepared by choosing a suitable grid design from any of the various known geometries, fabricating a non-conductive or poorly-conductive substrate of appropriate design and dimensions, e.g. using polymers such as PE, PP, polyamide and ABS to name a few. Suitable current collector designs include, but not limited to, book mold type grid designs, radial grids, expanded grids, punched foil, suitably perforated or unperforated plate or foil. The current collector substrate is rendered electrically conductive by depositing a metallic coating on part or the entire outer surface of said substrate by any of the means already outlined. Particularly suitable coatings include Pb and Pb-alloys noted above. In the case of composite current collectors containing Pb-based coatings for use in lead-acid batteries the density is in the range of 1 g/cm$^3$ to 10 g/cm$^3$, preferably 5 g/cm$^3$ to 7.5 g/cm$^3$ and the thickness of the metallic coating is between 25 μm and 5 mm, preferably between 0.1 mm and 2.5 mm. The voltage drop along the entire height of the current collector at an applied current of 100 Amperes ranges from 1 mV to 1 V, preferably between 10 mV and 250 mV.

While several specific embodiments of the invention have been described, it will be apparent that various modifications can be made without departing from the spirit and scope of the invention. Accordingly, it is not intended that the invention be limited, except as by the appended claims.

The invention claimed is:

1. An electrochemical cell comprising a composite current collector having a density in the range of 0.1 to 10 g/cm$^3$, the voltage drop across the entire height of said composite current collector at an applied current of 1 Ampere is between 1 mV and 250 mV and/or the voltage drop across the entire height of said composite current collector at an applied current of 100 Ampere is between 1 mV and 1 V and said composite current collector comprises a metallic layer having a thickness in the range of 10 and 5,000 microns and a polymer substrate.

2. An electrochemical cell according to claim 1, wherein said metallic layer comprises at least one metal selected from the group consisting of Zn, Cd, Hg, Ga, In, TI, Sn, Pb, As, Sb, Ca, Bi, Se; Sr, Ba, Bi, Ag, Se and Al.

3. An electrochemical cell according to claim 1, wherein said composite current collector has a surface roughness Ra in the range of 0.15 to 100 microns.

4. An electrochemical cell comprising a composite current collector according to claim 1 wherein said polymer substrate is selected from the group of filled or unfilled epoxy resin composites; epoxy resins; cellulose based materials; thermoplastic polyolefins (TPOs); thermoplastic polyester resins; thermoplastic polyester elastomers; crystalline, semi-crystalline and amorphous polymers; cellulose based materials; polyethylene; polypropylene; polyvinyl chloride (PVC); polytetrafluoroethylene (PTFE); polystyrene; acrylonitrile-butadiene -styrene (ABS); polyphthalamide (PPA), polycarbonate (PC), polyamide (PA), polyester (PET, PBT), polyacetals (POM); liquid crystal polymers (LCP), polyphenylene sulfide (PPS), polysulfone (PS) and polyetherimide (PEI); and wherein said polymer substrate contains between 0% and 75% per volume and/or weight of one or more filler materials selected from the group of (1) at least one metal, (2) a metal alloy or (3) at least one compound, selected from the group of Zn, Cd, Hg, Ga, In, Ti, Sn, Pb, As, Sb, Bi and Se.

5. An electrochemical cell according to claim 1 which is a galvanic cell comprising an aqueous electrolyte and a zinc negative electrode or a lead negative electrode containing said composite current collector.

6. An electrochemical cell according to claim 5, wherein said composite current collector has a surface roughness Ra in the range of 0.15 to 100 microns.

7. An electrochemical cell according to claim 1 which contains an aqueous electrolyte.

8. An electrochemical cell according to claim 7, which is a sealed cell and contains a hydrogen recombination catalyst.

9. An electrochemical cell according to claim 7, which is a sealed $MnO_2$—Zn cell and which after 6 years of storage at room temperature and/or 4 weeks at 65° C. has a pass rate with respect to leakage/frosting of over 85% and has a discharge capacity retention of more than 10%.

10. An electrochemical cell according to claim 1 containing an aqueous electrolyte wherein said composite current collector is substantially free of Cu.

11. An electrochemical cell according to claim 10, wherein said metallic layer of said composite current collector comprises at least one metal selected from the group consisting of In and Sn.

12. An electrochemical cell according to claim 10, wherein said composite current collector has a surface roughness Ra in the range of 0.15 to 100 microns.

13. An electrochemical cell according to claim 10, wherein the negative electrode is a zinc electrode and said zinc electrode comprises said composite current collector.

14. An electrochemical cell according to claim 13, wherein said zinc electrode is substantially free of Hg, Cd and Ph; and said composite current collector has a density in the range of 0.1 to 6 $g/cm^3$.

15. An electrochemical cell according to claim 14 wherein said metallic layer of said composite current collector comprises at least one metal selected from the group consisting of Zn, Ga, In, TI, Sn, As, Sb, Bi and Se.

16. An electrochemical cell according to claim 1 wherein said metallic layer has a tapered thickness profile.

17. An electrochemical cell according to claim 1, wherein said composite current collector has the shape of a nail, tube, foil, plate, woven mesh, expanded mesh or more complex shape selected from the group consisting of spiral, blade, formed or bent foil or tube, book mold type grid, radial grid, expanded grid, punched foil, perforated foils, open cell foam, ribbed current collector and bipolar plate.

18. An electrochemical cell according to claim 1, wherein said composite current collector is perforated or hollowed.

19. An electrochemical cell according to claim 1, which is a galvanic cell and contains a positive electrode comprising at least one active material selected from the group of manganese dioxide, lead-dioxide, nickel oxides and oxygen.

20. An electrochemical cell according to claim 1, which is a cylindrical cell or a prismatic cell.

* * * * *